US012732546B2

(12) United States Patent
Yang et al.

(10) Patent No.: US 12,732,546 B2
(45) Date of Patent: Sep. 8, 2026

(54) METHOD AND APPARATUS TO IMPROVE IMS REGISTRATION FAILURES OVER WLAN

(71) Applicant: INNOPEAK TECHNOLOGY, INC., Palo Alto, CA (US)

(72) Inventors: Jaehyeuk Yang, Palo Alto, CA (US); Xin Xu, Palo Alto, CA (US); Yongsheng Shi, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 282 days.

(21) Appl. No.: 18/374,826

(22) Filed: Sep. 29, 2023

(65) Prior Publication Data

US 2024/0022610 A1 Jan. 18, 2024

Related U.S. Application Data

(63) Continuation of application No. PCT/US2022/025354, filed on Apr. 19, 2022.

(Continued)

(51) Int. Cl.
*H04L 12/66* (2006.01)
*H04L 65/1016* (2022.01)

(Continued)

(52) U.S. Cl.
CPC ...... *H04L 65/1016* (2013.01); *H04L 65/1073* (2013.01); *H04W 84/12* (2013.01)

(58) Field of Classification Search
CPC ..... H04W 84/12; H04W 48/16; H04W 48/20; H04W 4/80; H04W 76/10; H04W 48/18;

(Continued)

(56) References Cited

U.S. PATENT DOCUMENTS

2006/0221901 A1* 10/2006 Yaqub .................. H04W 48/16 370/331
2009/0103455 A1* 4/2009 Balasubramanian ... H04W 8/06 370/254

(Continued)

FOREIGN PATENT DOCUMENTS

| | | |
|---|---|---|
| CN | 108965306 A | 12/2018 |
| CN | 111147493 A | 5/2020 |
| WO | 2019040092 A1 | 2/2019 |

OTHER PUBLICATIONS

WIPO, International Search Report for PCT Application No. PCT/US2022/025354, Aug. 19, 2022.

(Continued)

*Primary Examiner* — Kharye Pope
(74) *Attorney, Agent, or Firm* — Sheppard, Mullin, Richter & Hampton LLP

(57) ABSTRACT

Provided are a computer-implemented method, a computing system and a non-transitory storage medium. In the method, available Wireless Local Area Networks (WLANs) accessible on a User Equipment (UE) are determined. The available WLANs on the UE are prioritized based on degree of wireless connectivity. The UE is connected to a first WLAN with the highest degree of wireless connectivity. A registration request is sent, over the first WLAN, to an Internet Protocol Multimedia Subsystem (IMS) for the UE. A status of the IMS registration for the UE is received from the IMS, where the status includes a successful registration status or an unsuccessful registration status. Upon receiving the successful registration status of the IMS registration, data packets are transmitted to the IMS.

19 Claims, 7 Drawing Sheets

Related U.S. Application Data

(60) Provisional application No. 63/177,025, filed on Apr. 20, 2021.

(51) Int. Cl.
*H04L 65/1073* (2022.01)
*H04W 84/12* (2009.01)

(58) Field of Classification Search
CPC .. H04W 72/542; H04W 84/042; H04W 36/22
See application file for complete search history.

(56) References Cited

U.S. PATENT DOCUMENTS

2011/0305192 A1* 12/2011 Faccin .................. H04W 48/18 370/328
2012/0230305 A1 9/2012 Barbu et al.
2015/0305070 A1* 10/2015 Ahmad ................. H04W 76/10 370/338
2016/0127988 A1* 5/2016 Yao ....................... H04W 48/20 370/338
2016/0373946 A1* 12/2016 Lu ......................... H04W 12/08
2018/0183839 A1 6/2018 Chiang
2018/0242137 A1* 8/2018 Gupta ................. H04W 12/069
2019/0182734 A1 6/2019 Laliberte
2019/0335324 A1 10/2019 Ringland et al.
2020/0107254 A1* 4/2020 Cuevas Ramirez .. H04W 88/06
2020/0382424 A1* 12/2020 Jeong .................... H04W 48/16
2022/0124844 A1* 4/2022 Boyapalle ............. H04W 40/16
2023/0397070 A1* 12/2023 Naik ..................... H04W 60/00
2023/0422085 A1* 12/2023 Babbellapati ..... H04W 28/0268

OTHER PUBLICATIONS

CNIPA, First Office Action for CN Application No. 202280028623.2, Apr. 17, 2026, 18 pages.

* cited by examiner

Computing Component 600

Hardware Processors 602

Machine-Readable Storage Media 604

Determine available Wireless Local Area Networks (WLANs) on a User Equipment (UE) 606

Prioritizing the available WLANs on the UE based on a degree of wireless connectivity 608

Connecting the UE to a first WLAN with the highest degree of wireless connectivity 610

Sending, over the first WLAN, a registration request to an Internet Protocol Multimedia Subsystem (IMS) for the UE 612

Receiving, from the IMS, a status of the IMS registration for the UE 614

Upon receiving a successful registration status of the IMS registration, transmitting data packets to the IMS 616

FIG. 6

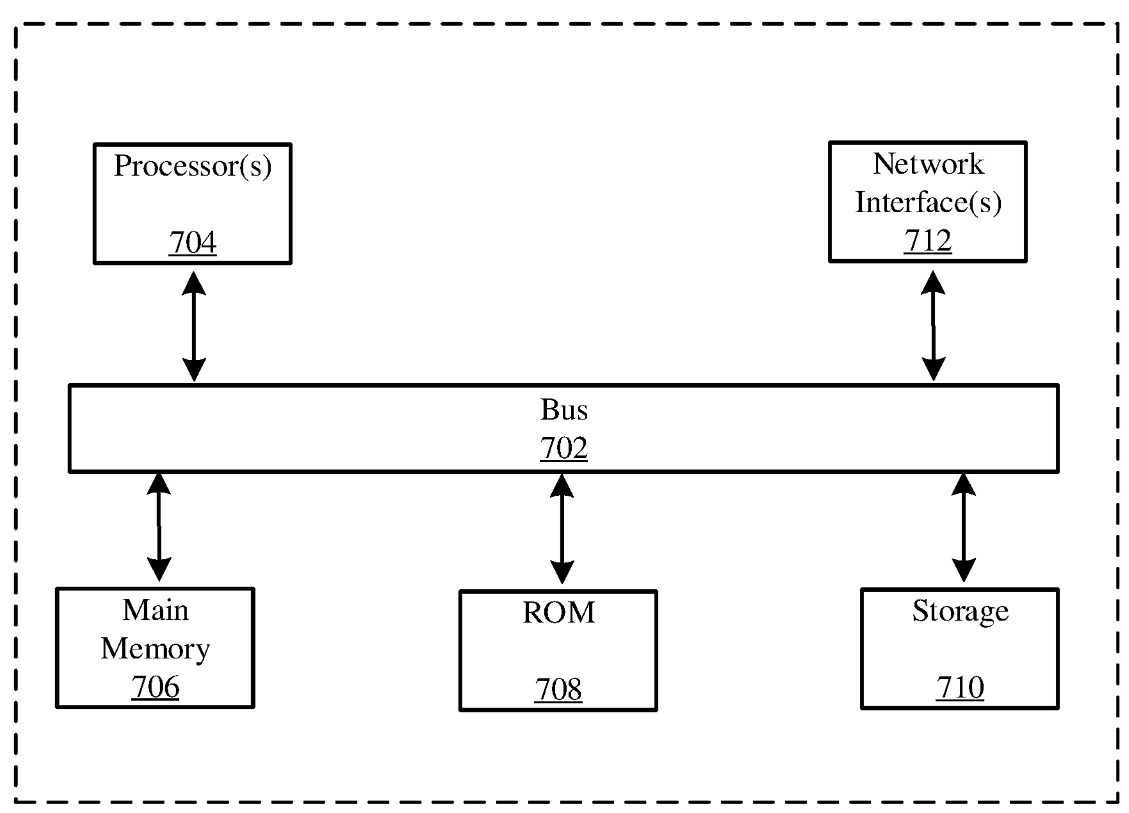
FIG. 7

METHOD AND APPARATUS TO IMPROVE IMS REGISTRATION FAILURES OVER WLAN

CROSS-REFERENCE TO RELATED APPLICATION

The present application is a continuation of international application No. PCT/US2022/025354, filed Apr. 19, 2022, which claims priority to U.S. Provisional Patent Application No. 63/177,025, filed Apr. 20, 2021, which are incorporated herein by reference in their entireties.

TECHNICAL FIELD

The present invention relates to an IP Multimedia Subsystem (IMS), and more particularly, to a computer-implemented method, a computing system and a non-transitory storage medium of IMS registration.

BACKGROUND

For a user of a UE to access an IP-based network to send and/or receive multimedia services, the UE must first register with the IMS by sending a request (e.g., a Session Initiation Protocol (SIP) register message). The Proxy-Call Session Control Function (P-CSCF) of the IMS will receive and forward the request to other functions or services that the IMS has access to, in order to obtain authorization, and then processes and forwards the responses of the request back to the UE. When a request has been authorized, the UE will have an established connection with the IMS and may use IP multimedia communications services that the IMS has access to.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments. These illustrative examples are mentioned not to limit or define the disclosure, but to provide examples to aid understanding thereof. Additional examples are discussed in the Detailed Description, and further description is provided there.

FIG. 6 illustrates a computing component that includes one or more hardware processors and machine-readable storage media storing a set of machine-readable/machine-executable instructions that, when executed, cause the one or more hardware processors to perform an illustrative method of the present disclosure.

FIG. 7 illustrates a block diagram of an example computer system in which various embodiments of the present disclosure may be implemented.

Figure 1:
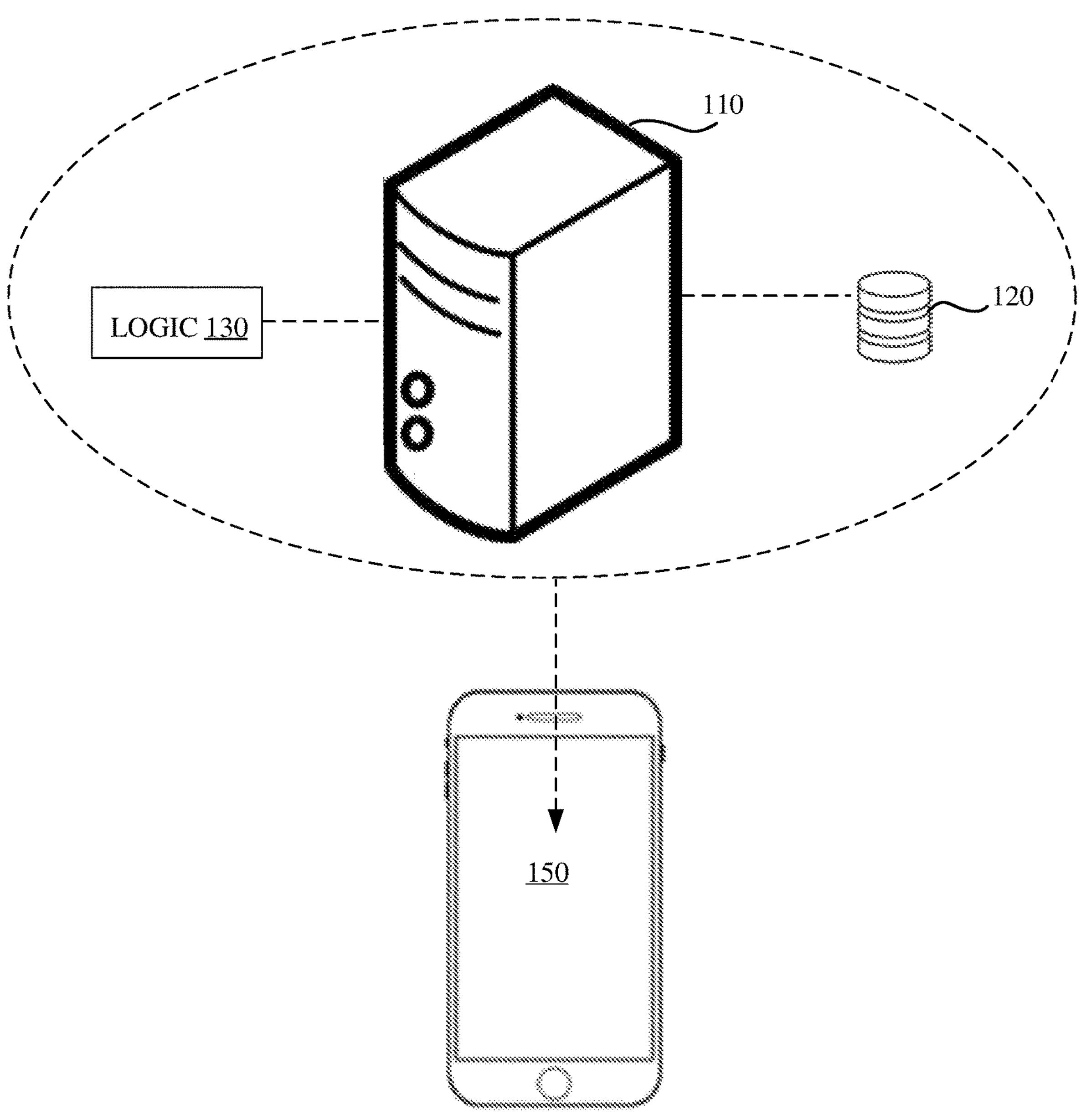
FIG. 1 is an example illustration of a computing system, within or otherwise associated with a UE, that determines a WLAN network to connect to and use to send a registration request to the IMS.

The figures are not exhaustive and do not limit the present disclosure to the precise form disclosed.

SUMMARY

In view of the above, the present disclosure proposes a computer-implemented method, a computing system and a non-transitory storage medium of IMS registration.

In a first aspect, an embodiment of the present disclosure provides a computer-implemented method. In the method, available Wireless Local Area Networks (WLANs) accessible on a User Equipment (UE) are determined. The available WLANs on the UE are prioritized based on degree of wireless connectivity. The UE is connected to a first WLAN with the highest degree of wireless connectivity. A registration request is sent, over the first WLAN, to an Internet Protocol Multimedia Subsystem (IMS) for the UE. A status of the IMS registration for the UE is received from the IMS, where the status includes a successful registration status or an unsuccessful registration status. Upon receiving the successful registration status of the IMS registration, data packets are transmitted to the IMS.

In a second aspect, an embodiment of the present disclosure provides a computing system within or associated with a User Equipment (UE). The computing system includes: one or more processors, and a memory storing instructions that, when executed by the one or more processors, cause the one or more processors to: determine available Wireless Local Area Networks (WLANs) accessible on the UE; prioritize the available WLANs on the UE based on degree of wireless connectivity, and connect the UE to a first WLAN with the highest degree of wireless connectivity. The instructions, when executed by the one or more processors, further cause the one or more processors further to: send, over the first WLAN, a registration request to an Internet Protocol Multimedia Subsystem (IMS) for the UE; receive, from the IMS, a status of the IMS registration for the UE, where the status includes a successful registration status or an unsuccessful registration status, and upon receiving the successful registration status of the IMS registration, transmit data packets to the IMS.

In a third aspect, an embodiment of the present disclosure provides a non-transitory storage medium storing instructions that, when executed by at least one processor of a computing system, cause the computing system to perform a method. In the method, available Wireless Local Area Networks (WLANs) accessible on a User Equipment (UE) are determined. The available WLANs on the UE are prioritized based on degree of wireless connectivity. The UE is connected to a first WLAN with the highest degree of wireless connectivity. A registration request is sent, over the first WLAN, to an Internet Protocol Multimedia Subsystem (IMS) for the UE. A status of the IMS registration for the UE is received from the IMS, where the status includes a successful registration status or an unsuccessful registration status. Upon receiving the successful registration status of the IMS registration, data packets are transmitted to the IMS.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

These illustrative embodiments are mentioned not to limit or define the disclosure, but to provide examples to aid understanding thereof. Additional embodiments are discussed in the Detailed Description, and further description is provided there.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION

Voice over Internet Protocol (VoIP), otherwise known as IP telephony, is a technology that allows for the delivery of voice communications and multimedia session over Internet Protocol (IP) networks, such as the Internet. This technology and method of voice communication has replaced the public switched telephone network (PSTN), otherwise known as the plain old telephone service (POTS). While VoIP has similar steps and principals as the PSTN, there are more advantages to using the VoIP over the PSTN, increasing its popularity and use in the market today.

Historically, mobile phones have provided voice call services over a circuit-switched-style network, rather than strictly over an IP-packet-switched network. As a means to standardize methods of delivering VoIP and other multimedia services to user equipment (UE) (e.g., a laptop, smart phone, tablet or any mobile device equipped with a mobile broadband adapter) over IP-based networks (e.g., Wireless Local Area Network (WLAN) or wireless LTE network), the wireless standards body 3rd Generation Partnership Project (3GPP) designed the IP Multimedia Subsystem (IMS). Essentially, the IMS is a standards-based architectural framework for delivering multimedia communications services such as voice, text, location, pictures, and video messaging over IP-based networks. IMS provides key features to enrich the end-user person-to-person communication experience through the use of standardized IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

For a user of a UE to access an IP-based network to send and/or receive multimedia services, the UE must first register with the IMS by sending a request (e.g., a Session Initiation Protocol (SIP) register message). The Proxy-Call Session Control Function (P-CSCF) of the IMS will receive and forward the request to other functions or services that the IMS has access to, in order to obtain authorization, and then processes and forwards the responses of the request back to the UE. When a request has been authorized, the UE will have an established connection with the IMS and may use IP multimedia communications services that the IMS has access to.

An IMS registration failure (e.g., a request being unauthorized or an established connection with the IMS being released/disconnected for the UE) may occur for various reasons. Examples include the P-CSCF server of the IMS being down temporarily, the core network of the IMS dropping Transmission Control Protocol (TCP) packets, and poor connection with the wireless network service blocking or dropping Encapsulating Security Payload (ESP) packets or the UE dropping outgoing/incoming packets to/from WLAN).

As described above, the IP Multimedia Subsystem (IMS) has been developed to standardize methods for delivering Voice over Internet Protocol (VoIP) and other IP multimedia services (e.g., voice, text, location, pictures, and video messages) amongst User Equipment (UE) (e.g., a laptop, smart phone, tablet or any mobile device equipped with a mobile broadband adapter) across the industry using IP-based networks (e.g., Wireless Local Area Network (WLAN) or wireless LTE network). For a UE to access the services provided by an IMS to deliver VoIP and other multimedia services, the UE must first be registered with the IMS. The UE may send a registration request message (e.g., a Session Initiation Protocol (SIP) register message) to the IMS, where the IMS network will authenticate the registration request message and other information related to the UE to determine if registration is authorized. Once the IMS has determined if the registration has been authorized, the IMS may send a message to the UE of the results of such authorization. If a UE has already been registered to the IMS, the IMS may nonetheless release or disconnect the connection with the UE. Once the UE loses connection with the IMS, the UE may send a new registration request to the IMS to be reauthorized before regaining access to the IP multimedia services provided by the IMS. There are a variety of reasons that may cause the IMS to not register the UE or release or disconnect the connection with the UE, including components, such as the Proxy-Call Session Control Function (P-CSCF) server, of the IMS being temporarily down, the core network of the IMS dropping Transmission Control Protocol (TCP) packets, and poor connection with the IP-based network or the UE dropping outgoing/incoming packets to/from the IMS over the IP-based network.

Accordingly, the present application provides solutions that address the challenges of registering a UE with the IMS or having a UE lose connection with the IMS as described above. Examples described herein implement a computing component within a UE or device that selectively connects the UE to an IP-based network, such as a WLAN, under some conditions or scenarios. First, the computing component within a UE may determine one or more available WLANs that are accessible on the UE. The one or more available WLANs may be prioritized or sorted in a list by order of the degree of wireless connectivity and/or quality of service of data transfer. The computing component may connect to the WLAN with the strongest connection based on the degree of wireless connectivity and/or quality of service, to have the highest likelihood of registering the UE with the IMS. Upon having the UE registered with the IMS, the UE may then have access to the services provided by the IMS and use the IMS to send and receive multimedia data packets. In some examples, the UE will receive a registration failure or unsuccessful registration status from the IMS. The computing component may perform one or more operations to selectively connect the UE to another IP-based network to increase the likelihood of registering the UE with the IMS and mitigate registration failures from occurring.

Various embodiments of the present disclosure can include computing systems, methods, and non-transitory computer readable media configured to execute instructions that, when executed by one or more processors, cause a computing system to determine available Wireless Local Area Networks (WLANs) accessible on a User Equipment (UE), prioritize the available WLANs on the UE based on degree of wireless connectivity, connect the UE to a first WLAN with the highest degree of wireless connectivity, send a registration request over the first WLAN to an Internet Protocol Multimedia Subsystem (IMS) for the UE, receive, from the IMS, a status of the IMS registration on the UE, and upon receiving a successful registration status of the IMS registration, transmit data packets to the IMS.

In some embodiments, upon receiving the unsuccessful registration status of the IMS registration, an Internet Protocol (IP) address of the first WLAN is refreshed, the UE is reconnected to the first WLAN, and the registration request is resent over the first WLAN to the IMS for the UE.

In some embodiments, upon receiving the unsuccessful registration status of the IMS registration, the UE is connected to a second WLAN with a second highest degree of wireless connectivity, and a second registration request is sent over the second WLAN to the IMS for the UE.

In some embodiments, upon receiving the unsuccessful registration status of the IMS registration, frequency bands of the available WLANs are determined, where the frequency bands include 2.4 GHz, 5 GHz, 6 GHz, and 60 GHz, the UE is connected to a third WLAN with a highest degree of wireless connectivity from one or more available WLANs with the frequency band of 2.4 GHz, and a third registration request is sent over the connected third WLAN to the IMS for the UE.

In some embodiments, upon a determination of available WLANs, a mobile mode of the UE is disabled, where the UE is unable to connect to a mobile network in a disabled mobile mode, and the available WLANs include one or more public WLANs and one or more private WLANs.

In some embodiments, the determination of the available WLANs includes determining a detection of one or more public WLANs and one or more private WLANs of the available WLANs, and a connection to the one or more public WLANs is selectively disabled by removing the one or more public WLANs from the available WLANs.

In some embodiments, in response to determining all of the one or more private WLANs of the available WLANs receive the unsuccessful registration status of the IMS registration, the connection to the one or more public WLANs is selectively enabled by adding the one or more public WLANs to the available WLANs.

In some embodiments, upon receiving the unsuccessful registration status of the IMS registration, a failure count for unsuccessful IMS registration is added to the first WLAN; and upon determining the total of failure counts of the first WLAN is over the threshold, the first WLAN is removed from the available WLANs.

In some embodiments, upon receiving the unsuccessful registration status of the IMS registration, registration statuses of the IMS registration received by all of the available WLANs are determined; and in response to the registration statuses of the IMS registration received by all of the available WLANs being the unsuccessful registration status, a WLAN detection mode on the UE is refreshed.

In some embodiments, the available WLANs is able to be determined in the WLAN detection mode.

In some embodiments, in response to determining all of the available WLANs received the unsuccessful status of the IMS registration, the WLAN detection mode is disabled, the mobile mode on the UE is enabled, and the UE is connected to a mobile network.

In some embodiments, in response to determining the available WLANs is zero, a WLAN detection mode is disabled, the mobile mode on the UE is enabled, and the UE is connected to a mobile network.

In some embodiments, the data packets include voice, text, location, pictures, and video messages.

FIG. 1 illustrates an example of a computing component 110 which may be internal to or otherwise associated within a device 150. In some examples, the device 150 may include, but is not limited to, a user equipment (UE) including a laptop, smart phone, tablet or any mobile device equipped with a mobile broadband adapter. The computing component 110 may control, coordinate, or determine (hereinafter "determine") one or more available IP-based networks. In some examples, the IP-based networks may include, but is not limited to, Wireless Local Area Networks (WLANs) or mobile networks such as 3G CDMA, 3G GSM, 4G LTE, 5G, and 6G. The computing component 110 may include one or more hardware processors and logic 130 that implements instructions to carry out the functions of the computing component 110, for example, determining available IP-based networks, sorting or prioritizing the available IP-based networks, connecting to a IP-based network, sending a registration request, receiving a response of the status of the registration request, and/or transmitting data packets. The computing component 110 may store, in a database 120, details regarding scenarios or conditions in which some IP-based networks are listed as available, an IP-based network is connected to, and some modes are to be disabled or enabled. Some of the scenarios or conditions will be illustrated in the subsequent FIGS.

Figure 2:
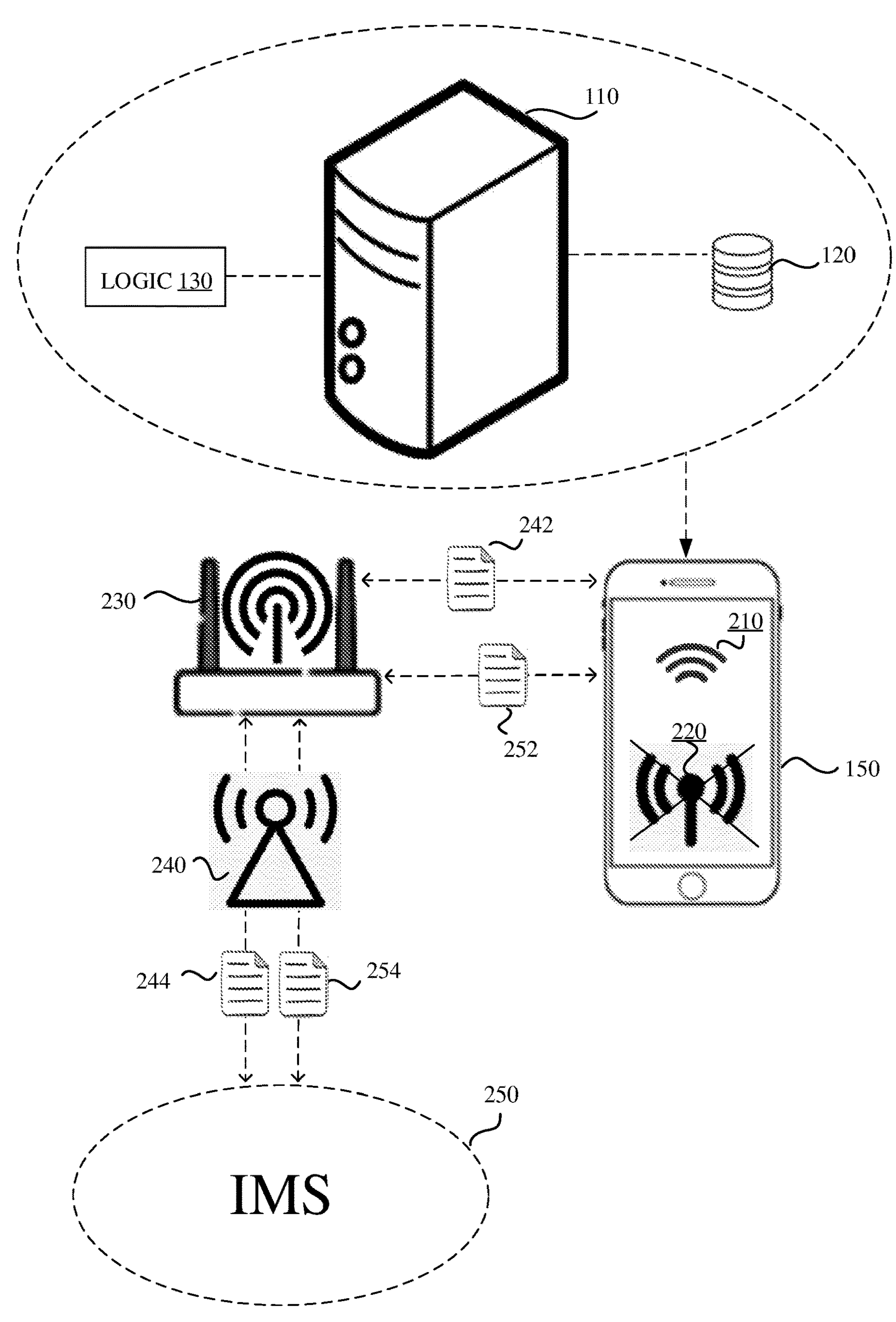
FIG. 2 is an example illustration of disabling connection to mobile networks and selectively connecting to a WLAN network to send a registration request to the IMS according to various embodiments of the present disclosure.

FIG. 2 illustrates an example scenario in which the computing component 110 may selectively choose an IP-based network, such as a WLAN or a mobile network, to connect to, for example, in order to increase the likelihood of registering the device 150 with the IMS 250. In some embodiments, when or if WLANs, such as Wi-Fi, are available and accessible to the device 150, the device 150 may disable the mobile network mode 220 and use the WLAN network mode 210 to connect to a WLAN, according to some conditions or scenarios. When the mobile network mode 220 is enabled, it may detect and connect the device 150 to a mobile or cellular network. When the WLAN network mode 210 is enabled, it may detect and connect the device 150 to one or more available WLANs. In some examples, a WLAN may be available for the WLAN network mode 210 of the device 150 to detect and connect to when the WLAN has a wireless connectivity satisfying a threshold. The wireless connectivity of a WLAN may be based on a wireless signal strength. In some examples, the wireless signal strength may be based on the quality of service regarding the transfer of data in the respective network. The quality of service may be based on bandwidth capacity, latency, variability in delay, data packet loss, data packet retransmissions, data packet collisions and/or overall network congestion. In some examples, the higher the quality of service equals a greater wireless connectivity of a WLAN network.

For example, in FIG. 2, the connection to the IP-based network may be established, via a network device 230 including one or more network devices, to an IP-based network, or connected in an ad-hoc fashion without a network device. The network device 230 may include an access point, router, switch, and/or gateway. Additionally, the transmission of signals such as audio or video signals may be conducted through IMS, which may be registered over the wireless IP-based network, for example, WLAN. The availability of an IP-based network may be based on its wireless connectivity which may encompass a wireless signal strength satisfying a threshold, a stability of the wireless signal satisfying a threshold, and/or other parameters of the wireless network satisfying a threshold, such as a distance of the wireless signal exceeding a threshold, a packet or frame drop rate being below a threshold, a transmission rate of packets or frames exceeding a threshold, a packet or frame size satisfying a threshold or range, and/or a consistency of a packet or frame size, as manifested by a standard deviation of the packet or frame size. As an example, a threshold signal strength may be 50 decibel milliwatts (dBm). Thus, a signal strength of greater or better than 50 dBm may constitute wireless connectivity being available. As another example, if a frame or packet drop rate is less than 1%, the wireless connectivity may be construed as being available.

In some examples, the computing component 110 may begin with enabling the WLAN network mode 210 and determining whether one or more Wireless Local Area Networks (WLANs), such as Wi-Fi, are available. The WLAN network mode 210 may determine one or more available WLANs are accessible for the device 150 if and when it can detect the presence of the available WLANs according to one or more factors. In some examples, when and if the WLAN network mode 210 determines one or more available WLANs are accessible for the device 150, the computing component 110 may disable the mobile network mode 220 on the device 150. Disabling the mobile network mode 220 while using the WLAN network mode 210 may facilitate a greater likelihood of connecting to a WLAN and decreasing the possibility of losing WLAN connection from mobile network interference.

The one or more WLANs available for the device 150 may include public WLAN networks and private WLAN networks. A public WLAN network is available for any device to connect to while a private WLAN network is only available for a device to connect to if the device has the required credentials (e.g., the password for the respective private Wi-Fi network).

The device 150 may be connected to any one of the available WLANs, regardless of whether it is a public network or a private network. To increase the likelihood of a strong connection and a successful registration with the IMS 250, the computing component 110 may connect device 150 to a WLAN in the list of available WLANs that has the highest degree of wireless connectivity. To determine which WLAN of the available WLANs has the highest degree of wireless connectivity, the available WLANs may first be sorted or prioritized in order of their degree of wireless connectivity or quality of service. A WLAN's degree of wireless connectivity may be based on various factors including its wireless signal strength, stability of the wireless signal, distance of the wireless signal, bandwidth capacity, latency, variability in delay, data packet loss or drop rate, data packet transmission rate, and/or network congestion. As an example, the degree of wireless connectivity can be represented using numbers consisting of 1 through 100, where the number 100 represents a WLAN network having a perfect or extremely high wireless connectivity and the number 1 represents a WLAN network having an extremely low wireless connectivity. As another example, the degree of wireless connectivity can be represented using percentages of 1% to 100%, where the percentage 100% represents a WLAN network having perfect or extremely high wireless connectivity and the percentage 1% represents a WLAN network having extremely low wireless connectivity. The available WLANs may be prioritized by their degree of wireless connectivity and listed in an order where the WLAN having the highest degree of wireless connectivity is the first WLAN on the list and the WLAN having the lowest degree of wireless connectivity is the last WLAN on the list.

Once the computing component 110 has prioritized and sorted the list of available WLANs that are accessible for device 150, the WLAN network mode 210 may connect device 150 to the first WLAN on the list having the highest degree of wireless connectivity amongst all of the available WLANs ("WLAN #1). After device 150 is connected to WLAN #1, the device 150 may send registration messages 242, 244 to the IMS. In some examples, the registration messages 242, 244 includes a request to register device 150 with IMS 250. The IMS 250 may receive the registration messages 242, 244 at the Proxy-Call Session Control Function (P-CSCF). After the P-CSCF of the IMS receives the registration request, the P-CSCF may validate the registration messages 242, 244 and forward it to the correct node(s) in the network to be authorized. In some examples, the registration request may include a request to use functions or services that the IMS contains or has access to, including the service to send multimedia communications to other IMS users. The multimedia communications may include voice, text, location, pictures, and video content messages. Once the registration messages 242, 244 have been reviewed by the IMS 250 network, the IMS 250 may send registration messages 242, 244 back to device 150. The IMS 250 may send registration messages 242, 244 by the P-CSCF. The registration messages 242, 244 sent by IMS 250 back to device 150 may include a status of the registration request, indicating if the registration with the IMS 250 was successful or unsuccessful. If the returned registration messages 242, 244 sent from IMS 250 to device 150 includes an unsuccessful registration status, the WLAN network mode 210 may disconnect from WLAN #1 and connect to the second WLAN on the list of available WLANs, the second WLAN having the second highest degree of wireless connectivity ("WLAN #2"). This process may continue until the IMS 250 has successfully registered the device 150 over a WLAN network.

The IMS 250 may send registration messages 242, 244 including a status of a registration failure when a successful registration of the device 150 with IMS 250 has been released or disconnected. There are a variety of reasons that may cause the IMS 250 to not register the device 150, or release or disconnect the registration connection with the device 150, including components, such as the P-CSCF server, of the IMS being temporarily down, the core network of the IMS dropping Transmission Control Protocol (TCP) packets, and poor connection with the IP-based network or the UE dropping outgoing/incoming packets to/from the IMS over the IP-based network.

The computing component 110 may prioritize connecting to a private WLAN network over a public WLAN network. Generally, private WLAN networks are more secure than public WLAN networks due to private WLAN networks being encrypted networks that require certain information or credentials to access, such as passwords, codes and email addresses. With private WLAN networks being more secure, it also has a higher likelihood of having stronger wireless connectivity than public WLAN networks since there is generally much less bandwidth consumption, data traffic, and network congestion due to the smaller number of users connected to and using a private WLAN network. Private WLAN networks may be prioritized over public WLAN networks by sorting the available WLANs to have all available private WLAN networks being higher on the list than all public WLAN networks. The available private WLAN networks and the available public WLAN networks may further be sorted in order of their degree of wireless connectivity or wireless signal strength.

In an example scenario, when the available WLANs detected by WLAN network mode 210 of device 150 includes both public WLAN networks and private WLAN networks, the computing component 110 may remove all public WLAN networks from the list of available WLANs and only have the private WLAN networks listed as the available WLANs. The WLAN network mode 210 of the device 150 may connect to any one of the available private WLAN networks and send registration messages 242, 244 to the IMS over a private WLAN network, via Voice over Wi-Fi 240 (VoWiFi 240). The WLAN network mode 210 of the device 150 may first connect to the available private WLAN network that has the highest degree of wireless connectivity to have the highest probability of obtaining a successful registration with the IMS 250.

The registration messages 242, 244 may include a request to register device 150 with IMS 250. The IMS 250 may receive the registration messages 242, 244 at the Proxy-Call Session Control Function (P-CSCF). After the P-CSCF of the IMS receives the registration request, the P-CSCF may validate the registration messages 242, 244 and forward it to the correct node(s) in the network to be authorized. In some examples, the registration request may include a request to use functions or services that the IMS contains or has access to, including the service to send multimedia communications to other IMS users. The multimedia communications may include voice, text, location, pictures, and video content messages. Once the registration messages 242, 244 have been reviewed by the IMS 250 network, the IMS 250 may send registration messages 242, 244 back to device 150. The IMS 250 may send registration messages 242, 244 by the P-CSCF. The registration messages 242, 244 sent by IMS 250 back to device 150 may include a status of the registration request, indicating if the registration with the IMS 250 was successful or unsuccessful.

The WLAN network mode 210 of the device 150 may continue to connect to a different private WLAN network amongst the list of available WLANs until it receives registration messages 242, 244 that include a successful registration status over one of the private WLAN networks. If the device 150 is connected to the available private WLAN network with the highest degree of wireless connectivity when it receives its first registration messages 242, 244 including an unsuccessful registration, the WLAN network mode 210 of the device 150 may connect to a second available private WLAN with the second highest degree of wireless connectivity, and so forth.

When and if the device 150 receives registration messages 242, 244 including an unsuccessful registration status over each of the available private WLAN networks, the computing component 110 may readd all public WLAN networks to the list of available WLANs. The WLAN network mode 210 of the device 150 may connect to any one of the available public WLAN networks and attempt to register to the IMS 250 over such public WLAN network, via VoWiFi 240. The WLAN network mode 210 of the device 150 may first connect to the available public WLAN network with the highest degree of wireless connectivity amongst the list of available public WLAN networks to have the highest probability of obtaining a successful registration with the IMS 250. The WLAN network mode 210 of the device 150 may continue to connect to a different public WLAN network amongst the list of available WLANs until it receives registration messages 242, 244 that include a successful registration status over one of the public WLAN networks.

When the device 150 receives registration messages 242, 244 over a first WLAN with a status of the registration request being unsuccessful or with a status of the registration connection being released or disconnected, the computing component 110 may refresh the Internet Protocol (IP) address of the first WLAN. After the IP address of the first WLAN is refreshed, the WLAN network mode 210 of the device 150 may reconnect to the first WLAN and resend registration messages 242, 244 over the first WLAN, via VoWiFi 240, to the IMS 250, with the registration messages 242, 244 including a request for registration. If the device 150 continues to receive registration messages 242, 244 from the IMS 250 including an unsuccessful registration status after the IP address of the first WLAN has been refreshed, the WLAN network mode 210 may disconnect from the first WLAN and connect to a second WLAN. The first WLAN may further be removed from the list of available WLANs.

When the device 150 receives registration messages 242, 244 including a status of the registration request being unsuccessful or with a status of the registration connection being released or disconnected for each available WLAN, the computing component 110 may refresh the WLAN network mode 210. Refreshing the WLAN network mode 210 may include turning the WLAN network mode 210 off and turning the WLAN network mode 210 back on. After the WLAN network mode 210 has been refreshed, the WLAN network mode 210 of the device 150 may reconnect to any one of the available WLANs and resend registration messages 242, 244 over the WLAN network, via VoWiFi 240, to the IMS 250, with the registration messages 242, 244 including a request for registration.

To further increase the likelihood of registering device 150 to the IMS 250 over a WLAN network, the computing component 110 may determine the frequency of bands of the available WLANs. The frequency of bands are measured in hertz (Hz) and may include 2.4 GHz, 5 GHz, 6 GHz, and 60 GHz. Any type of IP-based network, whether a WLAN network or a mobile network, employs both bands and frequencies. Once the frequencies of each available WLAN has been determined, the list of available WLANs may be prioritized and/or sorted by the type of frequencies, the degree of wireless connectivity, or both. The computing component 110 may prioritize all of the available WLANs that have a frequency of 2.4 GHz and have the WLAN network mode 210 first connect to the WLANs with a 2.4 GHz frequency before connecting to a WLAN with any other frequency. The WLAN network mode 210 may connect to the WLAN in the list of available WLANs with the highest degree of wireless connectivity amongst the WLANs with a 2.4 GHz frequency. Connecting to WLAN networks with a frequency of 2.4 GHz can increase the likelihood of registering the device 150 to the IMS 250 since the 2.4 GHz frequency band is typically only used for IMS data traffic, thus reducing any congestion and delay of IMS data traffic and increasing the likelihood of a higher degree of wireless connectivity for the WLAN network.

In another example scenario, if and when the device 150 receives a registration messages 242, 244 from the IMS 250 indicating that the registration with IMS 250 was unsuccessful over WLAN #1, the computing component 110 may add a failure count to the WLAN #1. The computing component 110 may further determine if a total of the failure counts on the WLAN #1 is above a threshold, and remove WLAN #1 from the list of available WLANS upon a determination that the total of failure counts on WLAN #1 is above the threshold. The computing component 110 may place WLAN #1 in a blacklist containing all of the WLANs that have a total of failure counts above the threshold. Until WLAN #1 has obtained a total of failure counts above the threshold, the computing component 110 will continue to instruct the WLAN network mode 210 of the device 150 to connect to WLAN #1 and send registration messages 242, 244 to the IMS 250 to over WLAN #1. The computing component 110 may store, in database 120, the blacklist of WLANs that have failed registration with the IMS 250 over a threshold. As an example, the threshold of registration failures allowed for each WLAN is 5. When and if device 150 receives a sixth registration messages 242, 244 from the IMS 250 over WLAN #1 indicating the IMS 250 has unsuccessfully registered device 150, the computing component 110 may remove WLAN #1 from the list of available WLANs and place WLAN #1 in a blacklist. The WLAN network mode 210 of the may connect to a WLAN with the next highest degree of wireless connectivity ("WLAN #2") and attempt to register device 150 with the IMS 250 over WLAN #2.

In an example scenario, the computing component 110 may remove any WLANs that were once available to the device 150 and have now become unavailable. A WLAN may become unavailable when its degree of wireless connectivity has dropped below a threshold. In addition, a WLAN may become unavailable if the WLAN has been placed on a blacklist. For example, after the computing component 110 instructs the WLAN network mode 210 of the device 150 to connect to a WLAN having the highest degree of wireless connectivity ("WLAN #1"), the device 150 may send registration messages 242, 244 to the IMS 250 over the WLAN #1, via VoWiFi 240. The IMS 250 may process the registration messages 242, 244 and send a response registration messages 242, 244 of the status of the registration process with the IMS 250 back to the device 150. The registration messages 242, 244 may include a request to register device 150 to the IMS 250 or a response to the registration request. The response in registration messages 242, 244 may notify the device 150 that the IMS 250 has successfully registered the device 150, where the device 150 may now use the multimedia services provided by the IMS 250. After device 150 has been successfully registered with IMS 250, if and when the degree of wireless connectivity of WLAN #1 drops below a threshold, the IMS 250 may send registration messages 242, 244 including a registration failure to the device 150, and release or disconnect the registration connection with the device 150. The device 150 may no longer use the multimedia services provided by the IMS 250 until a new registration has been successfully made with the IMS 250. The computing component 110 may remove the WLAN #1 from the list of available WLANs, instruct the WLAN network mode 210 to connect to the new WLAN #1 with the highest degree of wireless connectivity in the updated list of available WLANs, and send a new registration messages 242, 244 to the IMS 250 over the new WLAN #1, via VoWiFi 240.

In another example scenario, after the IMS 250 has received and processed the registration messages 242, 244 from the device 150, IMS 250 may send a registration messages 242, 244 back to the device 150 indicating that the registration with IMS 250 was unsuccessful. The computing component 110 may remove the WLAN #1 from the list of available WLANs, instruct the WLAN network mode 210 to connect to the new WLAN #1 with the highest degree of wireless connectivity in the updated list of available WLANs, and send a new registration messages 242, 244 to the IMS 250 over the new WLAN #1, via VoWiFi 240. Thus, the computing component 110 of device 150 may remove any WLAN from the list of available WLANs when using such WLAN has resulted in device 150 receiving registration messages 242, 244 including an unsuccessful registration status or a registration failure (hereinafter "unsuccessful registration status").

Figure 3:
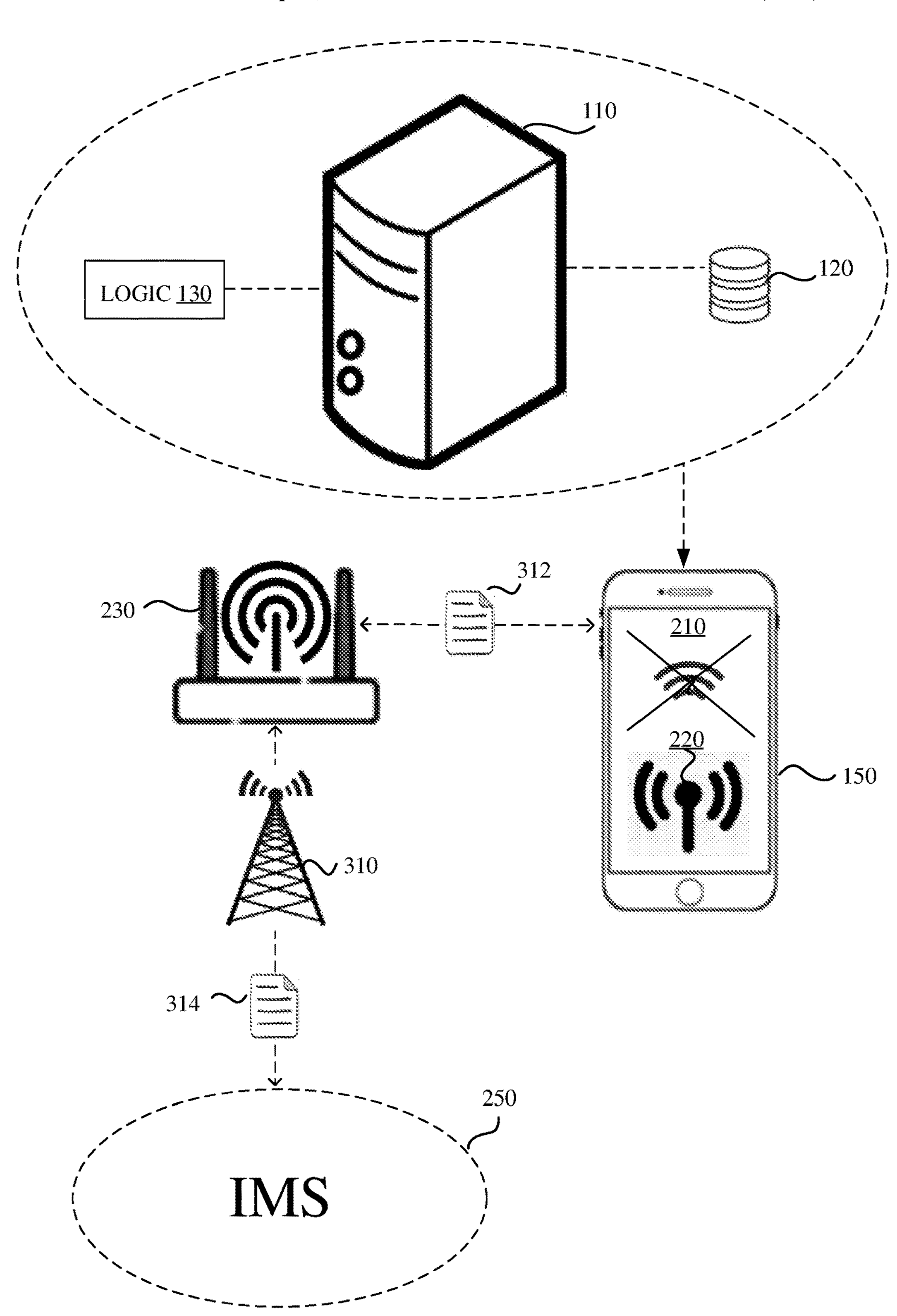
FIG. 3 is an example illustration of selectively disabling connection to WLAN networks and connecting to a mobile network to send a registration request to the IMS according to various embodiments of the present disclosure.

FIG. 3 illustrates an example scenario in which the computing component 110 may determine that there are zero WLANs available and accessible for the device 150 to connect to. This may be caused by the one or more potentially available WLANs having a degree of wireless connectivity below a threshold, the one or more WLANs that were on the availability list have been removed and placed in a blacklist for having a total of failure count over a threshold, all of the one or more WLAN networks on the availability list having caused the device 150 to receive registration messages 242, 244 including an unsuccessful registration status, or the WLAN network mode 210 of the device 150 is unable to detect the presence of any available WLAN. The computing component 110 may further determine zero WLANs being available and accessible for device 150 to connect to when all of the WLANs on the list of available WLANs have caused the device 150 to receive registration messages 242, 244 including an unsuccessful registration status after the WLAN network mode 210 of the device 150 has already been refreshed.

Once the computing component 110 makes a determination that the WLAN network mode 210 detects zero available WLANs accessible to the device 150, the computing component 110 may disable the WLAN network mode 210 and enable the mobile network mode 220 of the device 150. The computing component 110 may further instruct the mobile network mode 220 to connect the device 150 to a mobile or cellular network, such as 3G CDMA, 3G GSM, 4G LTE, 5G, or 6G. After the device 150 is connected to a mobile network, the device 150 may send multimedia data packets 312, 314, such as voice, text, location, pictures, and video messages, to the IMS 250 over the mobile network, via VoLTE or ViLTE, where the IMS 250 will forward the multimedia data packets 312, 314 to other IMS user devices. Digital voice and video packets may be encapsulated using a RTP (Real-Time Transport Protocol), UDP (User Datagram Protocol), and IP (Internet Protocol), and may include respective headers, such as data link layer headers. Additionally, the device 150 may exchange non-voice packets via the WLAN through the network device 230. The non-voice packets may not be exchanged with the another IMS user device and may encompass, for example, other data requested by the network device 230.

Figure 4:
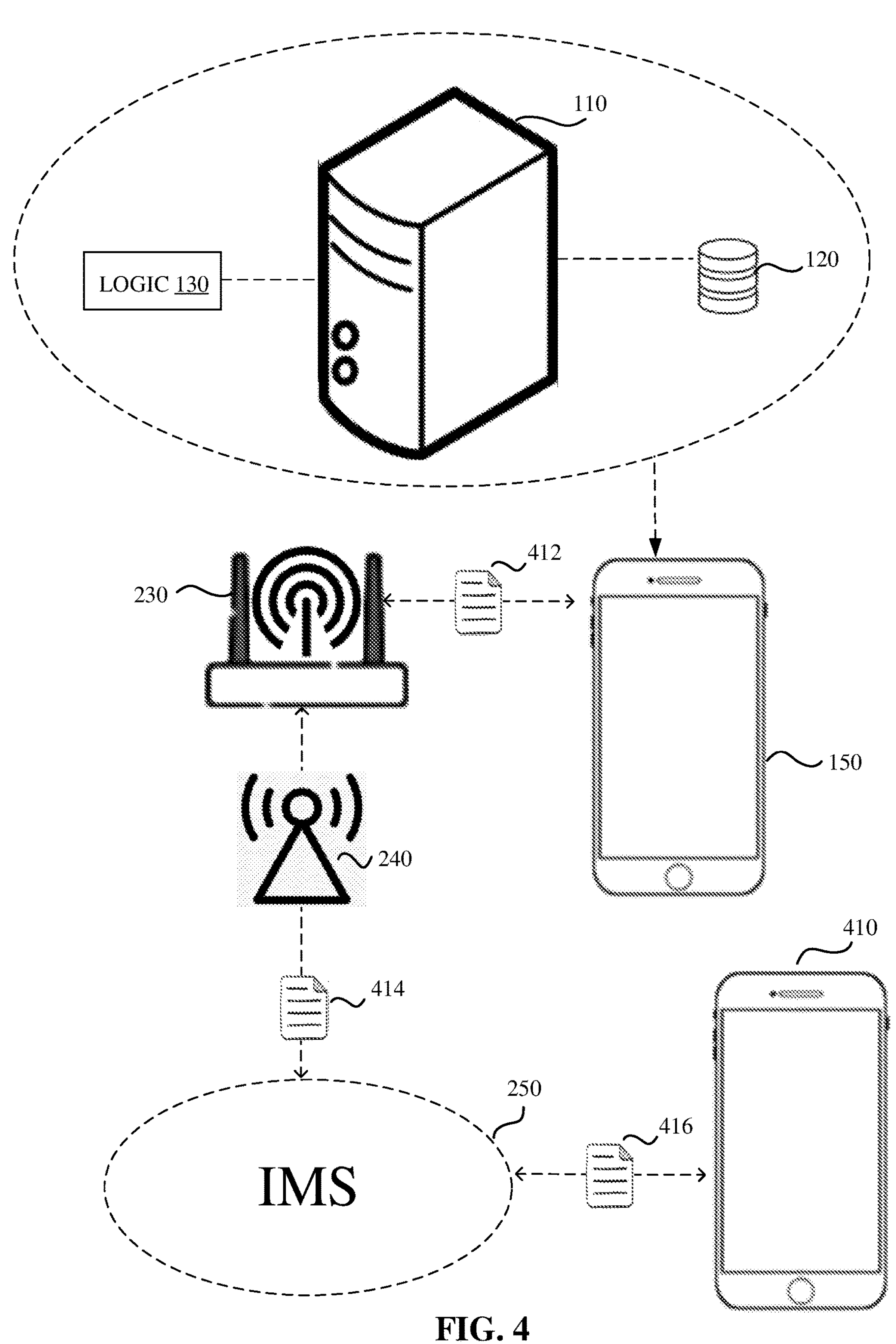
FIG. 4 is an example illustration of a successful registration with the IMS over a WLAN and sending data packets through the IMS according to various embodiments of the present disclosure.

FIG. 4 illustrates an example scenario in which device 150 is registered with IMS 250 over WLAN, such as Wi-Fi, and the device 150 is initiating a session or a call (e.g., a voice call, a video call, or a text message) over WLAN with device 410, via a network device 230, such as an access point, of a WLAN. In some embodiments, the device 150 may be exchanging audio, voice, and/or other data packets 412, 414, and 416 with device 410 by having the data packets 412, 414, and 416 transferred through the IMS 250 over the WLAN, via VoWiFi 240. Digital voice packets 412, 414, and 416 may be encapsulated using a RTP (Real-Time Transport Protocol), UDP (User Datagram Protocol), and IP (Internet Protocol), and may include respective headers, such as data link layer headers. Additionally, the device 150 may exchange non-voice packets via the WLAN through the network device 230. The non-voice packets may not be exchanged with the device 410 and may encompass, for example, other data requested by the network device 230.

Figure 5:
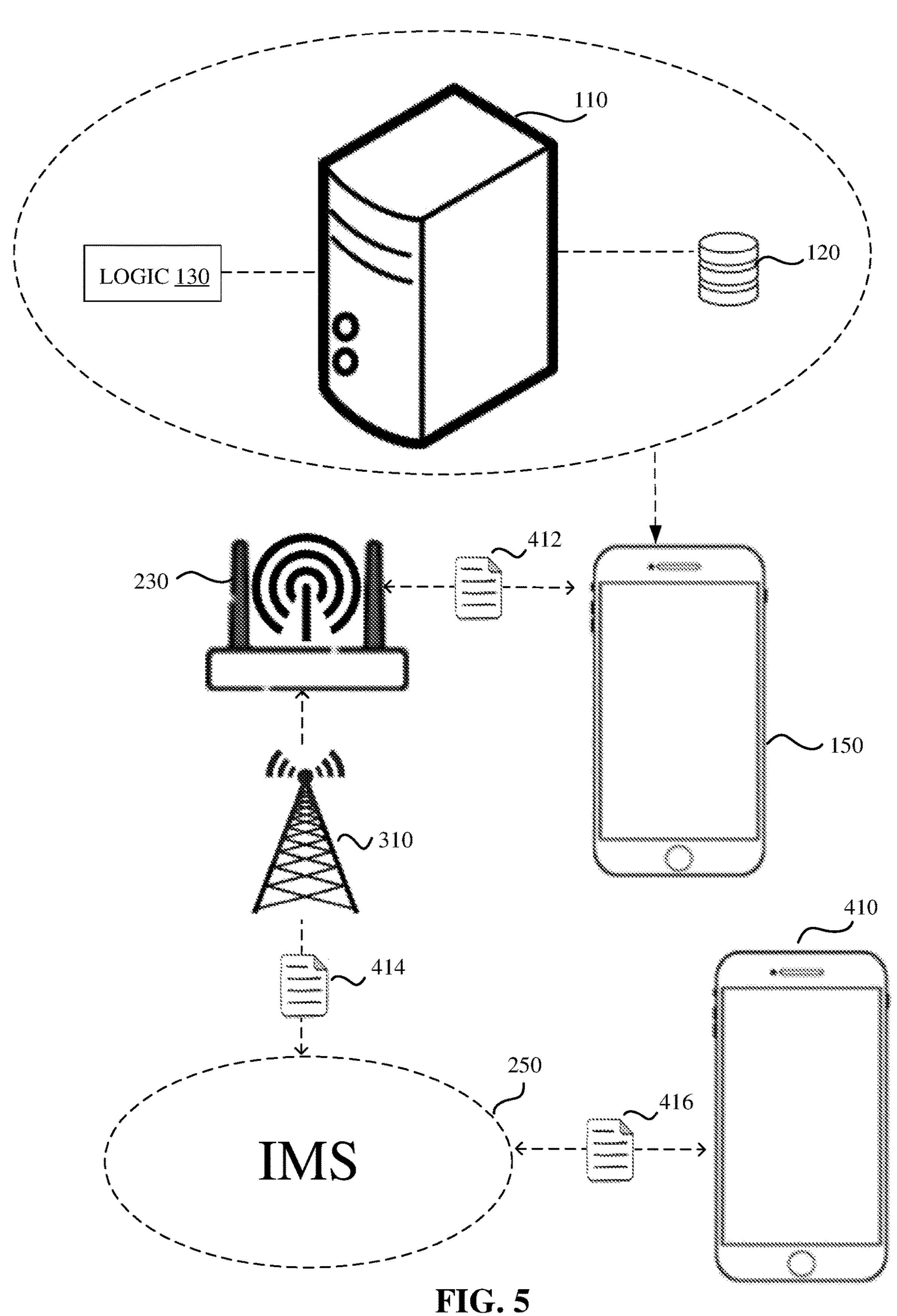
FIG. 5 is an example illustration of a successful registration with the IMS over a mobile network and sending data packets through the IMS according to various embodiments of the present disclosure.

FIG. 5 illustrates an example scenario in which device 150 is registered with IMS 250 over a mobile network and the device 150 is initiating a session or a call (e.g., a voice call, a video call, or a text message) over WLAN with device 410, via a network device 230, such as an access point, of a mobile network. The mobile network may include 3G CDMA, 3G GSM, 4G LTE, 5G, or 6G. In some embodiments, the device 150 may be exchanging audio, voice, and/or other data packets 412, 414, and 416 with device 410 by having the data packets 412, 414, and 416 transferred through the IMS 250 over the mobile network, via VoLTE 310. Digital voice packets 412, 414, and 416 may be encapsulated using a RTP (Real-Time Transport Protocol), UDP (User Datagram Protocol), and IP (Internet Protocol), and may include respective headers, such as data link layer headers. Additionally, the device 150 may exchange non-voice packets via the WLAN through the network device 230. The non-voice packets may not be exchanged with the device 410 and may encompass, for example, other data requested by the network device 230.

FIG. 6 illustrates a computing component 600 that includes one or more hardware processors 602 and machine-readable storage media 604 storing a set of machine-readable/machine-executable instructions that, when executed, cause the one or more hardware processors 602 to perform an illustrative method of mitigating and improving IMS registration of a UE, according to various embodiments of the present disclosure. It should be appreciated that there can be additional, fewer, or alternative blocks performed in similar or alternative orders, or in parallel, within the scope of the various examples discussed herein unless otherwise stated. The computing component 600 may be implemented as the computing component 110 of FIGS. 1-5. The computing component 600 may be, for example, the computing system 700 of FIG. 7. The computing component 600 may include a server. The hardware processors 602 may include, for example, the processor(s) 704 of FIG. 7 or any other processing unit described herein. The machine-readable storage media 604 may include the main memory 706, the read-only memory (ROM) 708, the storage 710 of FIG. 7, and/or any other suitable machine-readable storage media described herein.

At block 606, the hardware processor(s) 602 may execute the machine-readable/machine-executable instructions stored in the machine-readable storage media 604 to determine available WLANs accessible on a UE. In some examples, the available WLANs may include public Wi-Fi networks and private Wi-Fi networks. Public Wi-Fi networks are available for any UE to connect to while a private Wi-Fi network is only available for a UE to connect to if the UE has the required credentials (e.g., the password for the respective private Wi-Fi network). In some examples, the available WLANs may only include the private Wi-Fi networks by removing all public Wi-Fi networks from a list of available WLANs. In some examples, the available WLANs may only include public Wi-Fi networks if it is determined that all private Wi-Fi networks are unavailable or unsuccessful in IMS registration. In some examples, it may be determined that there are no available WLANs accessible on a UE and the UE may connect to a mobile network. Many variations are possible.

As an example, the hardware processor(s) 602 may disable a mobile network mode of the UE when there is a determination of available WLANs accessible on a UE. The mobile network mode may be the mode that connects the UE to a mobile network. The mobile network may include 3G CDMA, 3G GSM, 4G LTE, 5G, and 6G. In some examples, the hardware processor(s) 602 may enable the mobile network mode of the UE when there is a determination of zero available WLANs on the UE. Many variations are possible.

At block 608, the hardware processor(s) 602 may execute the machine-readable/machine-executable instructions stored in the machine-readable storage media 604 to prioritize the available WLANs on the UE based on a degree of wireless connectivity. In some examples, the degree of wireless connectivity may be based on the quality of service regarding the transfer of data in the respective network. The quality of service may be based on bandwidth capacity, latency, variability in delay, data packet loss, data packet retransmissions, data packet collisions, and network congestion. In some examples, the higher the quality of service equals a greater wireless connectivity of a WLAN network. Many variations are possible.

As an example, the hardware processor(s) 602 may prioritize and/or sort the available WLANs in a list. The list may be prioritized by degree of wireless connectivity by ordering the list from the highest degree of wireless connectivity to the lowest degree of wireless connectivity, with the first WLAN on the list being the network with the highest degree of wireless connectivity and the last WLAN on the list being the network with the lowest degree of wireless connectivity. In some examples, the degree of wireless connectivity can be represented using numbers consisting of 1 through 100, where the number 100 represents a WLAN network having a perfect or extremely high wireless connectivity and the number 1 represents a WLAN network having an extremely low wireless connectivity. In some examples, the degree of wireless connectivity can be represented using percentages of 1% to 100%, where the percentage 100% represents a WLAN network having perfect or extremely high wireless connectivity and the percentage 1% represents a WLAN network having extremely low wireless connectivity. Many variations are possible.

At block 610, the hardware processor(s) 602 may execute the machine-readable/machine-executable instructions stored in the machine-readable storage media 604 to connect the device to a first WLAN with the highest degree of wireless connectivity. The first WLAN may be the WLAN network that is highest on the list of available WLANs on the UE and that has the highest degree of wireless connectivity. The highest degree of wireless connectivity may equal to the highest or greatest quality of service regarding the transfer of data. In some examples, if the UE is unable to connect to the first WLAN on the list of available WLANs, the UE may connect to the second WLAN on the list, with the second WLAN having the second highest degree of wireless connectivity. The second highest degree of wireless connectivity may equal to the second highest quality of service regarding the transfer of data. In some examples, if the UE is unable to connect to the first WLAN and the second WLAN on the list, the UE may connect to the third WLAN, and so forth. Many variations are possible.

At block 612, the hardware processor(s) 602 may execute the machine-readable/machine-executable instructions stored in the machine-readable storage media 604 to send, over the first WLAN, a registration request to an Internet Protocol Multimedia Subsystem (IMS) for the UE. The registration request sent to the IMS may be a Session Initiation Protocol (SIP) message. The IMS may receive the registration request at the Proxy-Call Session Control Function (P-CSCF). After the P-CSCF of the IMS receives the registration request, the P-CSCF may validate the registration request and forward it to the correct node(s) in the network to be authorized. In some examples, the registration request may include a request to use functions or services that the IMS contains or has access to, including the service to send multimedia communications to other IMS users. The multimedia communications may include voice, text, location, pictures, and video content messages.

At block 614, the hardware processor(s) 602 may execute the machine-readable/machine-executable instructions stored in the machine-readable storage media 604 to receive, from the IMS, a status of the IMS registration on the UE. After the P-CSCF of the IMS forwards the registration request to the correct node(s) in the network to be authorized, the P-CSCF will receive a response regarding the registration from the node(s), process the response and forward the response to the UE. In some examples, the response may include a status of a successful registration where the UE is now registered with the IMS. When the UE is registered with the IMS, the UE may use functions or services of the IMS over the WLAN that it is connected to. In some examples, the response may include a status of an unsuccessful registration where the UE has not been registered with the UE. When the UE is not registered with the IMS, the UE may not use functions or services of the IMS over the WLAN that it is connected to. In some examples, the response of an unsuccessful registration may be caused by the IMS releasing or disconnecting an established connection with the UE. The IMS may release or disconnect an established connection with the UE for a variety of reasons, including when the P-CSCF server of the IMS being down temporarily, the core network of the IMS dropping Transmission Control Protocol (TCP) packets, and poor connection with the wireless network service blocking or dropping Encapsulating Security Payload (ESP) packets or the UE dropping outgoing/incoming packets to/from WLAN. Many variations are possible.

At block 616, the hardware processor(s) 602 may execute the machine-readable/machine-executable instructions stored in the machine-readable storage media 604 to transmit data packets to the IMS upon receiving a successful registration status of the IMS registration. In some examples, the data packets transmitted to the IMS from the UE may include voice, text, location, pictures, and video content.

Subsequently, the hardware processor(s) 602 may obtain connect to subsequent WLANs in the list of available WLANs and repeat the aforementioned blocks for each of the subsequent WLANs, until a successful registration status has been received from the IMS.

FIG. 7 illustrates a block diagram of an example computer system 700 in which various embodiments of the present disclosure may be implemented. The computer system 700 can include a bus 702 or other communication mechanism for communicating information, one or more hardware processors 704 coupled with the bus 702 for processing information. The hardware processor(s) 704 may be, for example, one or more general purpose microprocessors. The computer system 700 may be an embodiment of a video encoding module, video decoding module, video encoder, video decoder, or similar device.

The computer system 700 can also include a main memory 706, such as a random access memory (RAM), cache and/or other dynamic storage devices, coupled to the bus 702 for storing information and instructions to be executed by the hardware processor(s) 704. The main memory 706 may also be used for storing temporary variables or other intermediate information during execution of instructions by the hardware processor(s) 704.

The computer system 700 can further include a read only memory (ROM) 708 or other static storage device coupled to the bus 702 for storing static information and instructions for the hardware processor(s) 704. A storage device 710, such as a magnetic disk, optical disk, or USB thumb drive (Flash drive), etc., can be provided and coupled to the bus 702 for storing information and instructions.

Computer system 700 can further include at least one network interface 712, such as a network interface controller module (NIC), network adapter, or the like, or a combination thereof, coupled to the bus 702 for connecting the computer system 700 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 700, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques or technology described herein using customized hard-wired logic, one or more ASICs or FPGAs, firmware and/or program logic which in combination with the computer system 700 that causes or programs the computer system 700 to be a special-purpose machine. According to one or more embodiments, the techniques described herein are performed by the computer system 700 in response to the hardware processor(s) 704 executing one or more sequences of one or more instructions contained in the main memory 706. Such instructions may be read into the main memory 706 from another storage medium, such as the storage device 710. Execution of the sequences of instructions contained in the main memory 706 can cause the hardware processor(s) 704 to perform process operations described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 710. The volatile media can include dynamic memory, such as the main memory 706. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, an NVRAM, any other memory chip or cartridge, and networked versions of the same.

Non-transitory media is distinct from but may be used in conjunction with transmission media. The transmission media can participate in transferring information between the non-transitory media. For example, the transmission media can include coaxial cables, copper wire and fiber optics, including the wires that comprise the bus 702. The transmission media can also take a form of acoustic or light waves, such as those generated during radio-wave and infra-red data communications.

The computer system 700 also includes a network interface 712 coupled to bus 702. Network interface 712 provides a two-way data communication coupling to one or more network links that are connected to one or more local networks. For example, network interface 712 may be an integrated services digital network (ISDN) card, cable modem, satellite modem, or a modem to provide a data communication connection to a corresponding type of telephone line. As another example, network interface 712 may be a local area network (LAN) card to provide a data communication connection to a compatible LAN (or WAN component to communicated with a WAN). Wireless links may also be implemented. In any such implementation, network interface 712 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 712, which carry the digital data to and from computer system 700, are example forms of transmission media.

The computer system 700 can send messages and receive data, including program code, through the network(s), network link and network interface 712. In the Internet example, a server might transmit a requested code for an application program through the Internet, the ISP, the local network and the network interface 712.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or operations.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method, comprising:

determining available Wireless Local Area Networks (WLANs) accessible on a User Equipment (UE);

prioritizing the available WLANs on the UE based on degree of wireless connectivity;

connecting the UE to a first WLAN with the highest degree of wireless connectivity;

sending, over the first WLAN, a registration request to an Internet Protocol Multimedia Subsystem (IMS) for the UE;

receiving, from the IMS, a status of the IMS registration for the UE, wherein the status comprises a successful registration status or an unsuccessful registration status; and upon receiving the successful registration status of the IMS registration, transmitting data packets to the IMS;

wherein the method further comprises:

upon receiving the unsuccessful registration status of the IMS registration, refreshing an Internet Protocol (IP) address of the first WLAN;

reconnecting the UE to the first WLAN whose IP address has been refreshed; and resending, over the first WLAN whose IP address has been refreshed, the registration request to the IMS for the UE; and wherein the method further comprises:

upon a determination of the available WLANs, disabling a mobile mode of the UE, wherein the UE is unable to connect to a mobile network in a disabled mobile mode, and the available WLANs comprise one or more public WLANs and one or more private WLANs.

2. The computer-implemented method of claim 1, further comprising:

upon receiving the unsuccessful registration status of the IMS registration after the resending of the registration request, connecting the UE to a second WLAN with a second highest degree of wireless connectivity; and sending, over the connected second WLAN, a second registration request to the IMS for the UE.

3. The computer-implemented method of claim 1, further comprising:

upon receiving the unsuccessful registration status of the IMS registration after the resending of the registration request, determining first available WLANs from the available WLANs, wherein frequency bands of the first available WLANs comprise 2.4 GHz, 5 GHZ, 6 GHz, and 60 GHz;

connecting the UE to a third WLAN selected from the first available WLANs, the third WLAN being a WLAN with a highest degree of wireless connectivity and with the frequency band of 2.4 GHz among the first available WLANs; and sending, over the connected third WLAN, a third registration request to the IMS for the UE.

4. The computer-implemented method of claim 1, wherein the method further comprises:

determining a detection of the one or more public WLANs and the one or more private WLANs of the available WLANs; and selectively disabling a connection to the one or more public WLANs by removing the one or more public WLANs from the available WLANs.

5. The computer-implemented method of claim 4, further comprising:

in response to determining all of the one or more private WLANs of the available WLANs receive an unsuccessful registration status of the IMS registration, selectively enabling the connection to the one or more public WLANs by adding the one or more public WLANs to the available WLANs.

6. The computer-implemented method of claim 1, further comprising:

upon receiving the unsuccessful registration status of the IMS registration, adding to a failure count of unsuccessful IMS registration to the first WLAN;

upon determining a total of failure counts of the first WLAN is over a threshold, removing the first WLAN from the available WLANs.

7. The computer-implemented method of claim 1, further comprising:

upon receiving the unsuccessful registration status of the IMS registration, determining registration statuses of the IMS registration received by all of the available WLANs; and in response to the registration statuses of the IMS registration received by all of the available WLANs being the unsuccessful registration status, refreshing a WLAN detection mode on the UE, wherein the available WLANs is able to be determined in the WLAN detection mode.

8. The computer-implemented method of claim 1, further comprising:

in response to determining all of the available WLANs receive an unsuccessful status of the IMS registration, disabling a WLAN detection mode, enabling the mobile mode on the UE, and connecting the UE to the mobile network.

9. The computer-implemented method of claim 1, further comprising:

in response to determining the number of the available WLANs is zero, disabling a WLAN detection mode, enabling the mobile mode on the UE, and connecting the UE to the mobile network.

10. The computer-implemented method of claim 1, wherein the data packets comprise voice, text, location, pictures, and video messages.

11. A computing system within or associated with a User Equipment (UE), the computing system comprising:

one or more processors; and a memory storing instructions that, when executed by the one or more processors, cause the one or more processors to:

determine available Wireless Local Area Networks (WLANs) accessible on the UE;

prioritize the available WLANs on the UE based on degree of wireless connectivity;

connect the UE to a first WLAN with the highest degree of wireless connectivity;

send, over the first WLAN, a registration request to an Internet Protocol Multimedia Subsystem (IMS) for the UE;

receive, from the IMS, a status of the IMS registration for the UE, wherein the status comprises a successful registration status or an unsuccessful registration status; and upon receiving the successful registration status of the IMS registration, transmit data packets to the IMS; and the instructions that, when executed by the one or more processors, further cause the one or more processors to:

upon receiving the unsuccessful registration status of the IMS registration, determine at least one first available WLAN from the available WLANs, wherein a frequency band of the at least one first available WLAN comprises 2.4 GHz;

connect the UE to a third WLAN selected from the at least one first available WLAN, the third WLAN being a WLAN with a highest degree of wireless connectivity among the at least one first available WLAN; and send, over the connected third WLAN, another registration request to the IMS for the UE; and the instructions that, when executed by the one or more processors, further cause the one or more processors to:

upon a determination of the available WLANs, disable a mobile mode of the UE, wherein the UE is unable to connect to a mobile network in a disabled mobile mode, and the available WLANs comprise one or more public WLANs and one or more private WLANs.

12. The computing system of claim 11, wherein the instructions that, when executed by the one or more processors, further cause the one or more processors to:

upon receiving the unsuccessful registration status of the IMS registration after the sending of the registration request, connect the UE to a second WLAN with the second highest degree of wireless connectivity of the available WLANs; and send, over the connected second WLAN, a second registration request to the IMS for the UE.

13. The computing system of claim 11, wherein the instructions that, when executed by the one or more processors, further cause the one or more processors to:

upon receiving the unsuccessful registration status of the IMS registration after the sending of the registration request, add to a failure count for unsuccessful IMS registration to the first WLAN; and upon determining a total of failure counts of the first WLAN is over a threshold, remove the first WLAN from the available WLANs.

14. The computing system of claim 11, wherein the instructions that, when executed by the one or more processors, further cause the one or more processors to:

upon receiving the unsuccessful registration status of the IMS registration, determine registration statuses of the IMS registration received by all of the available WLANs; and in response to the registration statuses of the IMS registration received by all of the available WLANs being the unsuccessful registration status, refresh a WLAN detection mode on the UE, wherein the available WLANs is able to be determined in the WLAN detection mode.

15. The computing system of claim 13, wherein the instructions that, when executed by the one or more processors, further cause the one or more processors to:

in response to determining all of the available WLANs receive an unsuccessful status of the IMS registration, disable a WLAN detection mode, enable the mobile mode on the UE, and connect the UE to the mobile network.

16. A non-transitory storage medium storing instructions that, when executed by at least one processor of a computing system, cause the computing system to perform a method comprising:

determining available Wireless Local Area Networks (WLANs) accessible on a User Equipment (UE);

prioritizing the available WLANs on the UE based on degree of wireless connectivity;

connecting the UE to a first WLAN with the highest degree of wireless connectivity;

sending, over the first WLAN, a registration request to an Internet Protocol Multimedia Subsystem (IMS) for the UE;

receiving, from the IMS, a status of the IMS registration for the UE, wherein the status comprises a successful registration status or an unsuccessful registration status; and upon receiving the successful registration status of the IMS registration, transmitting data packets to the IMS;

wherein the connecting the UE to the first WLAN with the highest degree of wireless connectivity, comprises:

determining at least one first available WLAN from the available WLANs, wherein a frequency band of the at least one first available WLAN comprises 2.4 GHz;

determining, as the first WLAN, a WLAN with a highest degree of wireless connectivity among the at least one first available WLAN; and connecting the UE to the first WLAN; and wherein the method further comprises:

upon a determination of the available WLANs, disabling a mobile mode of the UE, wherein the UE is unable to connect to a mobile network in a disabled mobile mode, and the available WLANs comprise one or more public WLANs and one or more private WLANs.

17. The computer-implemented method of claim 1, wherein the mobile network comprises 3G CDMA, 3G GSM, 4G LTE, 5G, or 6G.

18. The computer-implemented method of claim 9, wherein the refreshing the WLAN detection mode comprises:

turning the WLAN network mode off and then turning the WLAN network mode back on.

19. The computer-implemented method of claim 1, wherein the degree of wireless connectivity of each available WLAN is based on at least one of a wireless signal strength, stability of the wireless signal, a distance of the wireless signal, bandwidth capacity, latency, variability in delay, data packet loss or drop rate, data packet transmission rate, and network congestion of the available WLAN.

* * * * *